United States Patent
Brady et al.

(10) Patent No.: US 9,370,809 B2
(45) Date of Patent: Jun. 21, 2016

(54) IN-SITU THERMAL DESORPTION PROCESSES

(71) Applicant: RETERRO, INC., Pleasanton, CA (US)

(72) Inventors: Patrick Richard Brady, Sisters, OR (US); Brian Desmarais, Kenebunk, ME (US)

(73) Assignee: RETERRO INC., Dresden (DE)

( * ) Notice: Subject to any disclaimer, the term of this patent is extended or adjusted under 35 U.S.C. 154(b) by 0 days.

(21) Appl. No.: 14/485,814

(22) Filed: Sep. 15, 2014

(65) Prior Publication Data

US 2015/0078828 A1    Mar. 19, 2015

Related U.S. Application Data

(60) Provisional application No. 61/878,625, filed on Sep. 17, 2013.

(51) Int. Cl.
*B09C 1/02* (2006.01)
*B09C 1/06* (2006.01)
*B09C 1/00* (2006.01)

(52) U.S. Cl.
CPC . *B09C 1/06* (2013.01); *B09C 1/005* (2013.01); *B09C 2101/00* (2013.01)

(58) Field of Classification Search
CPC ............ B09C 1/00; B09C 1/005; B09C 1/06; B09C 2101/00
USPC ............................. 405/128.35, 128.4, 128.55
See application file for complete search history.

(56) References Cited

U.S. PATENT DOCUMENTS

| 5,076,727 | A | * | 12/1991 | Johnson | B09C 1/062 405/128.35 |
| 5,558,463 | A | * | 9/1996 | Geisel | B09C 1/00 166/57 |
| 5,664,911 | A | * | 9/1997 | Bridges | B09C 1/00 405/128.4 |
| 5,788,412 | A | * | 8/1998 | Jatkar | B09C 1/005 166/272.1 |
| 6,485,232 | B1 | * | 11/2002 | Vinegar | B09C 1/062 405/128.15 |
| 6,824,328 | B1 | * | 11/2004 | Vinegar | B09C 1/062 166/60 |
| 6,951,436 | B2 | * | 10/2005 | Stegemeier | B09C 1/06 405/128.4 |
| 7,618,215 | B2 | * | 11/2009 | Haemers | B09C 1/06 405/128.8 |
| 2004/0126190 | A1 | * | 7/2004 | Stegemeier | B09C 1/06 405/128.6 |
| 2004/0228689 | A1 | * | 11/2004 | Stegemeier | B09C 1/00 405/128.35 |
| 2008/0069640 | A1 | * | 3/2008 | Haemers | B09C 1/06 405/128.85 |
| 2008/0175670 | A1 | * | 7/2008 | Richter | B09C 1/06 405/128.4 |
| 2013/0202363 | A1 | * | 8/2013 | Haemers | B09C 1/06 405/258.1 |

FOREIGN PATENT DOCUMENTS

CA    2569621 A1 * 12/2005 ............... B09C 1/06

* cited by examiner

*Primary Examiner* — Frederick L Lagman

(57) ABSTRACT

Contaminated soil can be in-situ cleaned without an excavation process. Heated gas can be injected to the contaminated soil to heat the soil for vaporizing the contaminants. Vacuum extraction can be used for extracting the volatile contaminants. Cool air can be injected to the cleaned soil to prevent total organic carbon degradation.

9 Claims, 9 Drawing Sheets

Forming holes in a ground soil
190

Flowing a hot gas to the holes, wherein the hot gas is configured to desorb contaminants in the ground soil
191

Collecting contaminants
192

Flowing a cool gas to the holes, wherein the cool gas is configured to cool the ground soil
193

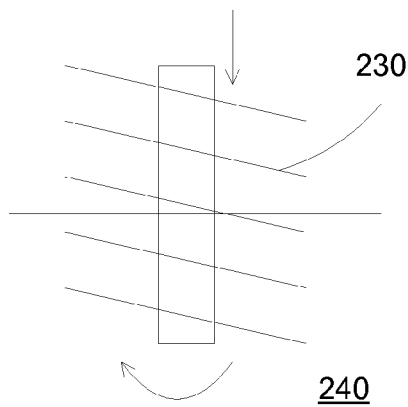
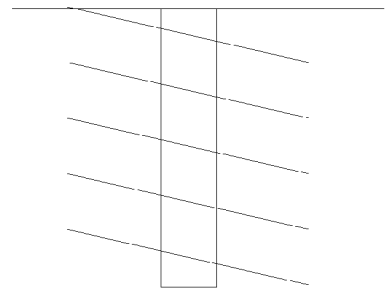
FIG. 2A
FIG. 2B
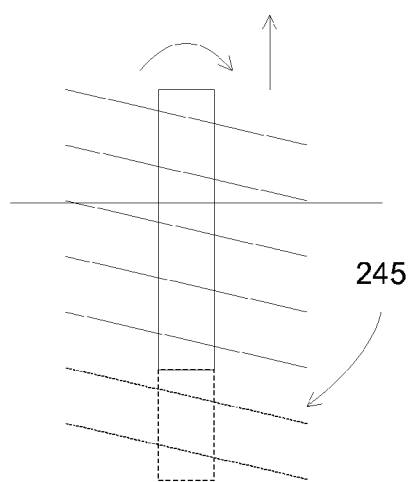
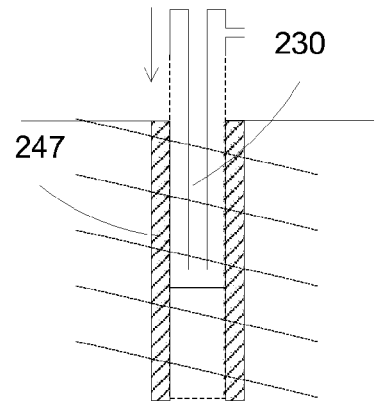
FIG. 2C
FIG. 2D
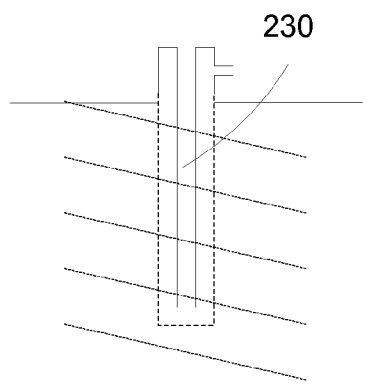
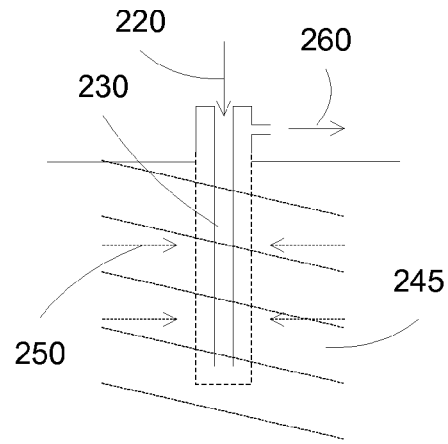
FIG. 2E
FIG. 2F

IN-SITU THERMAL DESORPTION PROCESSES

The present application claims priority from U.S. provisional patent application Ser. No. 61/878,625, filed on Sep. 17, 2013, entitled "In-situ thermal desorption processes", which is incorporated herein by reference.

BACKGROUND

The use of petroleum hydrocarbons as a fuel source is ubiquitous in society. Consequently, petroleum hydrocarbon products are stored and handled in great quantities. One risk associated with the storage and handling of petroleum hydrocarbons is the potential for spillages during handling or the potential for leakage during storage. Due to the negative environmental impact associated with spills and leakages of petroleum hydrocarbons, rules have been established at the local, state and federal levels. These rules primarily focus on preventing petroleum hydrocarbon releases to the environment from occurring. These rules also have provisions that require the responsible party to remediate petroleum hydrocarbon releases to the environment.

In the field of petroleum hydrocarbon remediation from soil, there are two basic approaches: applying a treatment technique to soil in place (in-situ), or applying a treatment technique to excavated soil (ex-situ). There are advantages and disadvantages for each approach and the selection of the approach is based on the site-specific circumstances of each petroleum hydrocarbon release.

In-situ thermal desorption technologies can include techniques that involve inserting hot rods in the ground soil for heating the ground soil, which can release volatile contaminants.

There can a need for an in-situ process that is labor, time and energy efficient in the treatment process, and is environmentally friendly.

SUMMARY

In some embodiments, the present invention discloses systems and methods for in-situ processing contaminated soil without an excavation process. Heated gas can be injected to the contaminated soil to heat the soil for vaporizing the contaminants. Vacuum extraction can be used for extracting the volatile contaminants. Cool air can be injected to the cleaned soil to prevent total organic carbon degradation.

In some embodiments, the present invention discloses methods and systems for in-situ cyclic treatment of contaminate ground soil. In a high pressure regime, hot gas flow can enter the ground soil, heating the soil and vaporizing the contaminants. In a low pressure regime, the vaporized contaminants can be attracted to the low pressure area, removing the contaminants from the soil. Cool air can be injected to the cleaned soil to prevent total organic carbon degradation.

BRIEF DESCRIPTION OF THE DRAWINGS

FIGS. 2A-2F illustrate a process for inserting a dual wall well point to a ground soil according to some embodiments.

DETAILED DESCRIPTION

Figures 1A, 1B:
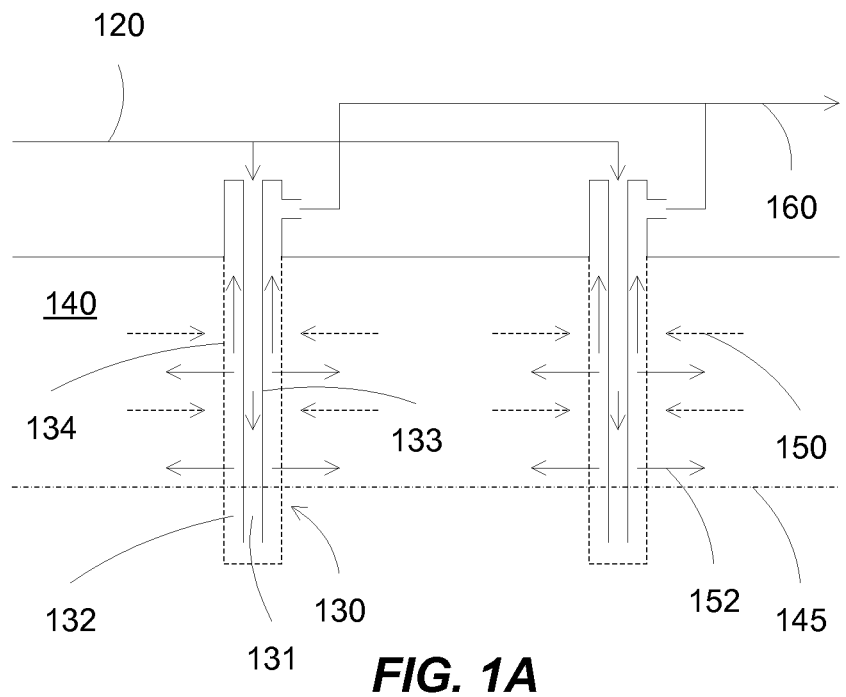
FIGS. 1A-1B illustrate schematic of an in-situ evaporative desorption according to some embodiments.

In some embodiments, the invention relates to a process and apparatus for non-combustive thermal desorption of volatile contaminates from contaminated earth. The earth may include tar sand, oil sand, oil shale, bitumen, pond sediment, and tank bottom sediment. The concentration of the contaminates can be low concentration, e.g., less than about 3%, or high concentration, e.g., greater than about 3%. The process can provide cracking of the contaminates, and/or reclaiming condensable contaminates, then oxidizing and treating the non-condensable reclamation effluent, which can be recycled for use as the thermal desorption treatment gas.

The non-combustive thermal desorption of volatile contaminates from low concentration contaminated earth is described in U.S. Pat. No. 6,829,844 (Brady et al) which is incorporated herein by reference in its entirety. The thermal desorption is intended to remove organic contamination from porous media such as soil, rock, clays or other porous media with low organic contamination (less than 3% organic contamination) where desiccated electrically heated atmospheric air is used as the primary treatment gas. High organic contamination (greater than 3%) requires an inert (low oxygen) treatment gas to preclude explosions.

In some embodiments, the invention relates to a process and apparatus for thermal desorption of contaminates from a mixture of soil and rocks using non-combustion-heated fresh treatment gas, such as air, to treat the soil and rocks in-situ, e.g., the soil and rocks are treated while in the ground without being excavated.

In some embodiments, a thermal desorption technique applied to a static configuration of contaminated soil in the ground is provided. The thermal desorption technique can restore the soil to its un-contaminated condition by removing the contamination within the soil through the evaporative desorption process. To provide an efficient remediation process, different temperature settings can be used to treat different contaminated soil, and thus sample of the contaminated soil can be tested to determine appropriate treatment conditions.

In some embodiments, systems and methods are provided to supply thermal desorption of high-concentration hydrocarbon contaminants from ground soil, such as tar sand, oil sand, oil shale, bitumen, pond sediment, and tank bottom sediment. Heated treatment gases can be introduced to the ground soil to heat the ground soil and the contaminated earth. Hot gas extraction, e.g., treatment gases containing contaminates, can be withdrawn from the ground soil. The process is continued until the contaminates are completely removed from the soil, e.g., below a desired contamination level.

In some embodiments, systems and methods to treat contaminated soil are provided, including in-situ processing of the contaminated soil without excavation process. For example, heated gas can be injected to the contaminated soil to heat the soil for vaporize the contaminants. The soil can be loosen in the treatment area, for example, by auger drilling or trench holes. Hard soil walls or shoring plates can be used for side walls. Vacuum extraction can be used for extracting the volatile contaminants. Alternatively, heat can be provided in the inner pipe of a dual wall well to treat the soil in-situ, followed by cool air to prevent total organic carbon degradation.

In some embodiments, desiccated hot (~600-1,200 F) air can be circulated into a dual wall driven well point. The dual wall driven well point can include an outer pipe with perforations and a smaller diameter pipe inside the outer pipe. The interior pipe is used to inject dry hot air into the bottom of the dual wall well point. The hot air returns to the surface, for example, with a variable frequency drive induction fan mounted in an output module. The hot air circulation through the dual wall well point creates heat in subsurface soils. The hot air is cooled as it returns to the surface. The cooling reduces the volume of air, which in turn draws soil vapors into the duel wall well point casing. The extracted air volume is treated through a heated catalyst.

In some embodiments, the variable frequency drive induction fan is controlled by a PLC which will gradually increase the applied vacuum to the well points as the extracted vapors elevate in temperature. The net effect of the increased vacuum is to draw soil vapors containing contaminants into the well casing.

In some embodiments, the soil is cooled after being treated, for example, to stop the natural occurring total organic carbon (TOC) degradation (such as acetone and methyl ethyl ketone (MEK) production). Under the heat treatment, the underground hot soils stay hot for a long time. Hot soils with high TOC concentrations (which can be commonly found in fine grain soils) can exhibit uncontrolled thermal degradation of TOC resulting in acetone and MEK production.

In some embodiments, methods are provided to cool the subsurface soils in a controlled manner. For example, once thermal treatment is complete, cool air is circulated through the driven well points. Acetone and MEK vapors are drawn into the well casing and treated through the output module. The cool air is circulated until temperatures have exhibited a significant cooling trend. Water is pumped through the well points as a final cooling effort, which will stop the TOC thermal degradation.

In some embodiments, waste heat can be recovered from the heated catalyst. A heat exchanger can move waste heat to the well point casings. When a PLC set point is reached, the heat recovery air will be used to supplement the air from the ceramic heaters. The ceramic heaters will reduce their flow once the recovery heat air begins to operate.

In some embodiments, the well point array will be placed as equilateral triangles approximately 6 to 9 feet off center. Upon successful treatment each well point will be pulled from the subsurface. The sacrificial drive point located at the head of the well point will remain in the hole. As the well points are removed, bentonite slurry is poured through the well casing to properly abandon the well bore.

FIGS. 1A-1B illustrate schematic of an in-situ evaporative desorption according to some embodiments. In FIG. 1A, well points 130 can be driven to the contaminate ground soil 140. The well points can be placed below the water table 145, which is an upper surface of a zone of saturated water. In general, below a certain depth, the ground is saturated with water, forming a zone of saturated water, if it is permeable enough to hold water. The well points 130 can include a double wall structure, such as a pipe or a tube, forming an inner pipe 131 within an outer pipe 132, having an inner wall 133 separating the inner pipe and the outer pipe. The outer wall 134 of the well point can be perforated, for example, to allow exchanging of gaseous materials with the ground soil. For example, a hot gas can enter the well point, and enter the ground soil through the perforated wall. The hot gas can heat the ground soil, either by the heated well point or by the hot gas entering the ground soil. The contaminates in the ground soil can be heated, becoming volatile, and flow to the well point through the perforated wall. In some embodiments, the perforated outer wall can include stainless steel wire wrap well screen to provide the maximum open area for vapor flow.

In operation, a hot gas 120 can flow to the inner pipe 131 and return through the outer pipe 132, and to an exhaust 160. During the return, e.g., when flowing along the outer pipe 132, a portion of the hot gas can pass 152 through the perforation of the outer wall 134 to the ground soil. The hot well point 130, the hot gas flow along the outer pipe, and the hot gas flow 152 can heat the ground soil in the vicinity of the well point 130. When the ground soil is heated, contaminants in the ground soil can be evaporated. For example, the contaminants can be hydrocarbon contaminants in liquid form, mixing in the ground soil. When the soil is heated to a temperature about 1000 F, the liquid hydrocarbon can change phase, e.g., becoming volatile. A volatile contaminants flow 150 can enter the perforation of the outer wall 134, and can travel with the returned hot gas to be collected at the exhaust 160. For example, at the ground soil, the evaporated contaminants can exist at a high concentration, and thus can migrate to the well point. The evaporated contaminants can be recovered, for example, by condensing the hydrocarbon contaminants from the exhaust flow 160.

A partial vacuum, e.g., a low pressure regime, can be formed at the outer pipe 132 to assist in generating the contaminant flow 150. The partial vacuum can be formed by a temperature gradient or by a pressure gradient. For example, the hot gas can be hotter at the bottom of the well point in the outer pipe, and then gradually cooled off along the length of the outer pipe. The temperature gradient can generate a pressure gradient, e.g., a lower pressure regime at the outer pipe, which can attract the contaminant flow 150 from the ground soil area. A pressure gradient at the outer pipe can also be formed by a Bernoulli effect, for example, by changing the flow rate of the return hot gas along the outer pipe. For example, a variation in cross sections of the outer pipe can generate different flow velocities, leading to different pressure regime. A bottom large cross section and a top small cross section can generate higher flow at the top, leading to lower pressure at the top. The lower pressure can attract the contaminant flow 150 from the ground soil area.

FIG. 1B shows a flow chart for an in-situ thermal desorption process according to some embodiments. A hot gas can be introduced to a ground soil, heating the ground soil and contaminants in the ground soil. The contaminants can vaporized, and the vaporized contaminants can be captured together with the returned hot gas. A single wall or a double wall well point can be used to accept the hot gas.

Operation 190 forms a hole in a ground soil. The soil can be contaminate soil, e.g., soil having hydrocarbon contaminants embedded therein. The hole can be formed by inserting a hollow conduit, such as a single wall or double wall well point. The hole can be the hollow volume inside the hollow conduit. The hole can also be formed by inserting and withdrawing a conduit, leaving a hole in the ground soil. The hole can have fluidic communication between an inside of the hole with the ground soil. For example, for an empty hole, e.g., a hole formed by inserting and then withdrawing a tube, the hole can automatically have fluidic communication, since the wall of the hole is the ground soil material, which is porous and can allow liquid or gas to pass through. For a well point hole, e.g., a hole formed by inserting a well point to the ground soil, the outer wall of the well point can be perforated to allow fluidic communication with the ground soil.

In some embodiments, multiple holes can be formed, separating be a distance between 6 and 9 ft, at equilateral distance. The distance between the holes can be chosen so that contaminants can be extracted to the holes.

Operation 191 flows a hot gas to the hole. For example, a hot gas can flow to an interior of an empty hole, e.g., to the inner volume of the empty hole in the ground soil. The hot gas can flow to an interior of a well point in the empty hole, for example, to an inner pipe of a double wall well point, which is disposed in the ground soil. The hot gas can be configured to desorb contaminants in the ground soil. For example, the hot gas can heat the ground soil, and evaporate the volatilable contaminants. The volatile contaminants can leave the ground soil, for example, by being attracted to the hole and escaping the hole together with the hot gas. The hot gas can have a temperature above the temperature of the ground soil. The hot gas can have a temperature above a vaporization temperature of a contaminant in the ground soil. For example, the temperature of the hot gas can be between 600 and 1200 F (about 300-650 C).

Operation 192 collects contaminants. For example, the hot gas can enter and then leave the hole, together with the contaminants. The hot gas and the contaminants can pass through a heat exchanger, in which the contaminants can condense and be collected.

After the contaminants are extracted from the ground soil, operation 193 flows a cool gas to the hole. The cool gas can have a temperature below the temperature of the hot gas. The cool gas can have a room temperature, a room temperature air can flow to the hole. For example, the temperature of the cool gas can be about room temperature (between 50-100 F or 10-40 C). The cool gas can be configured to cool the ground soil, for example, after all contaminants have been removed from the contaminated ground soil. The immediate cooling of the ground soil can prevent damage to the ground soil, for example, by stopping the degradation of organic carbon in the ground soil.

In some embodiments, the ground soil can be loosen, for example, by auger drilled holes or trench holes before inserting the well points.

FIGS. 2A-2F illustrate a process for inserting a dual wall well point to a ground soil according to some embodiments. In FIGS. 2A-2C, an auger drill 230 can be driven to and then withdrawn from the ground soil 240. The soil 245 surrounding the auger drill 230 can be loosen. In FIGS. 2D-2E, walls of hard soil or shoring plates 247 can be erected surrounding the loosened contaminated soil. A well point 230 can be inserted to the ground soil. In FIG. 2F, a hot gas 220 can flow to an inner pipe of the well point 230. The hot gas 260 can return from an outer wall of the well point 230, carrying volatile contaminants that flow 250 from the ground soil. The loosen soil 245 can facilitate the contaminant flow 250, e.g., increasing the porosity of the ground soil to ease the contaminant flow.

Figure 3A:
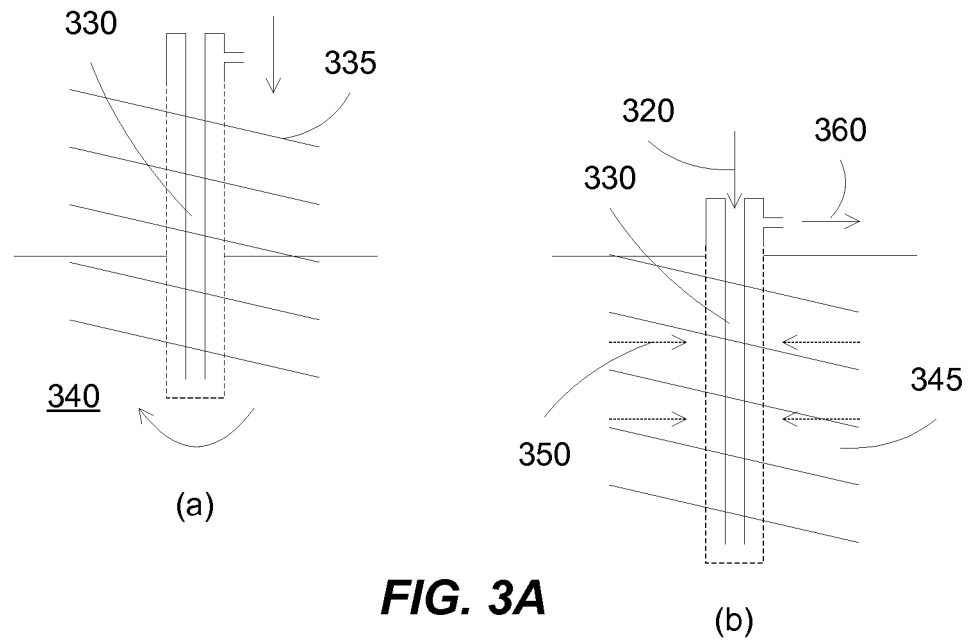
FIGS. 3A-3B illustrate a configuration of well points to a ground soil according to some embodiments.
Figure 3B:
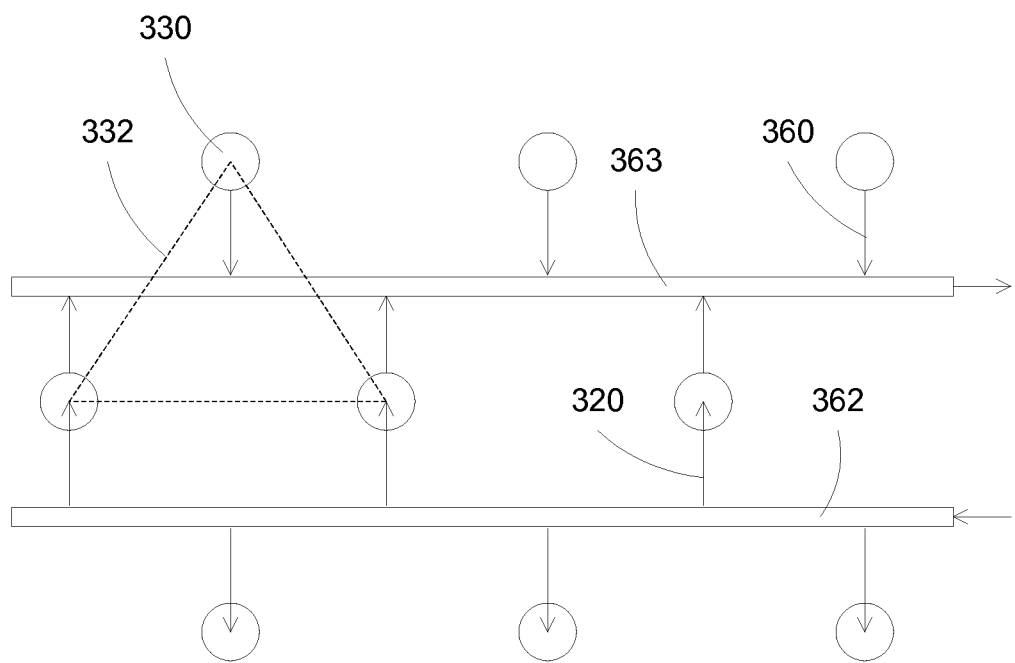

FIGS. 3A-3B illustrate a configuration of well points to a ground soil according to some embodiments. In FIG. 3A(a), a well point 330 can include fin 335, for example, that forms a helical configuration. The well point can be driven to the ground soil 340, for example, by rotating the well point with the helical fins loosing the surrounding soil. In FIG. 3A(b), a hot gas 320 can flow to an inner pipe of the well point 330. The hot gas can return from an outer wall of the well point 330, carrying volatile contaminants that flow 350 from the ground soil. The loosen soil 345 can facilitate the contaminant flow 350, e.g., increasing the porosity of the ground soil to ease the contaminant flow.

FIG. 3B shows a top view of a well point configuration. Multiple well points 330 can be arranged in equilateral triangles, with similar or same distance 332 between each two adjacent well points. The distance 332 between the well points can be between 6 and 9 ft (or between 1.5 and 3 m). Manifolds for hot gas inlets and outlets can be placed between the well points, for example, alternating between two rows of well points. For example, a manifold 362 for providing hot gas inlets 320 can be placed between first two rows of well points. A manifold 363 for accepting returned hot gas outlets 360 can be placed between a row of the first two rows and an adjacent row of well points.

In some embodiments, the present invention discloses systems and methods for in-situ thermal desorption of hydrocarbon contaminate soil. Hot gas can flow to the ground soil and then return, for example, to a recovery assembly. The hot gas can heat the ground soil to convert the hydrocarbon contaminants into volatile contaminants, e.g., evaporating the liquid hydrocarbon contaminants. The return hot gas can attract the volatile contaminants, for example, by generating a low pressure regime, thus the volatile contaminants can flow from the ground soil to merge with the returned hot gas, for example, to be processed by the recovery assembly.

In some embodiments, the present invention discloses systems and methods for generating a low pressure regime to recover volatile contaminants from nearby ground soil. A double wall assembly can be configured to accept a hot gas flow and then return the spent hot gas, including an inner conduit surrounded by an outer conduit. For example, a hot gas can enter an inner conduit of the double wall assembly, flow to the bottom of the double wall assembly, and return by an outer conduit of the double wall assembly.

In some embodiments, the double wall assembly can be configured so that a low pressure regime can be established at the outer conduit when the hot gas returns from the inner conduit. The low pressure regime can be formed by a change in temperature of the return hot gas flow. For example, the hot gas can be hotter at the bottom of the outer conduit, and become cooler at the top of the outer conduit, with the reduction of temperature due to the heat loss to the surrounding ground soil. The outer wall of the outer conduit can be perforated, for example, by having holes or slits, or by using a well screen as the outer wall of the double wall assembly. The perforation can assist in increasing the heat loss to the ground soil, for example, by a heat flow through the perforation to the ground soil. The temperature difference of the hot gas flow in the outer conduit can result in a difference in gas pressure, with a higher pressure at the hotter portion of the gas and a lower pressure at a cooler portion of the gas. The low pressure portion can assist in generating a contaminant flow from the ground soil, through the perforation, and merging with the hot gas flow. The contaminant flow can act to clean the ground soil, by removing the contaminants from the ground soil.

In some embodiments, the double wall assembly can be configured to generate a low pressure regime at the outer conduit based on Bernoulli principle using the returned hot gas flow. In general, according to Bernoulli principle, a higher flow can result in a lower pressure, thus the outer conduit can be configured to have a lower gas flow at the bottom of the outer conduit and a higher gas flow at the top of the outer conduit. For example, the outer conduit can have a higher flow conductance, such as having higher cross section, at the bottom as compare to that at the top of the outer conduit. Alternatively or additionally, a cross section area reduction at an outlet of the outer conduit can also generate a higher gas flow, resulting in a lower pressure.

Figure 4:
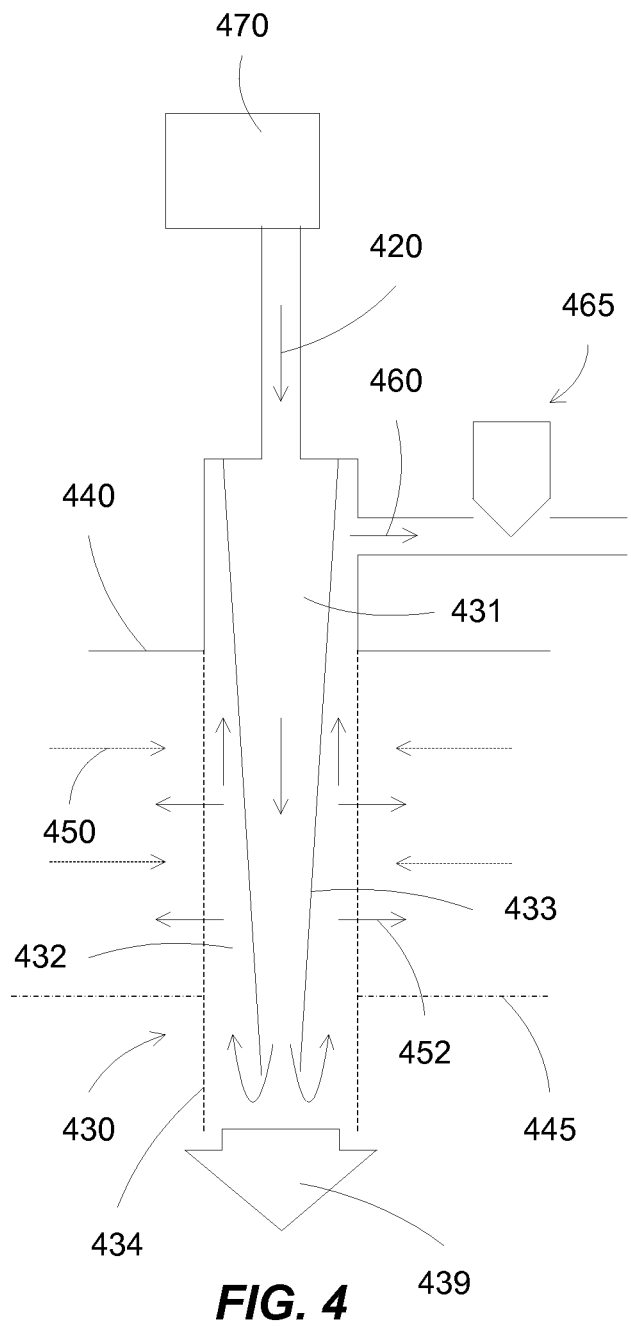
FIG. 4 illustrates a double wall assembly for in-situ thermal desorption processes according to some embodiments.

FIG. 4 illustrates a double wall assembly for in-situ thermal desorption processes according to some embodiments. A double wall assembly 430, such as a well point, can include an inner conduit 431 inside an outer conduit 432. An inner wall 433 can be used to separate the inner conduit 431 and the outer conduit 432. A portion of an outer wall 434 can be perforated, for example, having holes or slits to communicate with the surrounding soil.

The outer conduit can be configured to have a lower flow velocity at a bottom portion as compare to a flow velocity at a top portion. For example, the inner wall 433 can be tapered so that there is a larger cross section of the outer conduit at the bottom. In addition, a restrictor 465 can be disposed at an outlet of the double wall assembly, which can generate a higher flow velocity. The difference in velocities can create a difference in pressure, which can assist in attracting volatile components from the surrounding soil.

The double wall assembly 430 can be driven to a ground soil 440, for example, at contaminate soil location. A pointed head 439 can be coupled to an end of the double wall assembly for ease of inserting the double wall assembly to the ground soil. In addition, the soil can be loosen, and/or porous wall can be formed in the ground before inserting the double wall assembly. The double wall assembly can be inserted to a point below a water table 445, for example, to effectively treating the contamination. Multiple double wall assemblies can be placed at equal distances from each other, for example, to treat a large contaminate ground area.

In operation, a hot gas 420 can be provided to the double wall assembly 430, a heat conductive vapor lift well point that uses a primary heat delivery, such as hot gas 420, to lift vapor from the ground soil. The hot gas can include a dry gas, such as a dry hot air for treating wet contaminated soil, or a wet gas, such as a wet hot air for treating dry contaminated soil. Other hot gas configurations can be used, such as hot gas with additives such as a hot gas with ethanol extraction additives. The hot air can be around 1000 F, such as between 600 to 1200 F, or between 800 and 1200 F. The hot gas 420 can be generated from a heater/blower system 470.

The hot gas 420 can enter the inner conduit 431, and return along the outer conduit 432. The returned hot gas flow 460 can be intercepted by the restrictor 465, resulting in a higher flow and lower pressure at the outer conduit 432. The hot gas flow can be released 452 to the surrounding ground soil from perforation along the outer wall 434 of the double wall assembly 430. The heat loss of the return hot gas flow in the outer conduit 432 can form a temperature difference along the outer conduit, resulting in a lower pressure at the outer conduit 432.

The release 452 of the hot gas to the ground soil can heat the ground soil and the contaminants in the ground soil, turning the contaminants into vapor. A high pressure at the ground soil (due to the vaporization of liquid contaminants into vapor contaminants) and a low pressure at the outer conduit (due to the temperature and flow differences along the outer conduit) can drive the vapor contaminants from the surrounding ground soil to the outer conduit, generating a contaminant flow 450 passing the perforated outer wall 434 to merge with the returned hot gas flow in the outer conduit.

The double wall assembly with the hot gas flow can treat the contaminate ground soil in-situ, e.g., without excavating the soil, resulting in a cost effective way for contamination removal.

Figure 5:
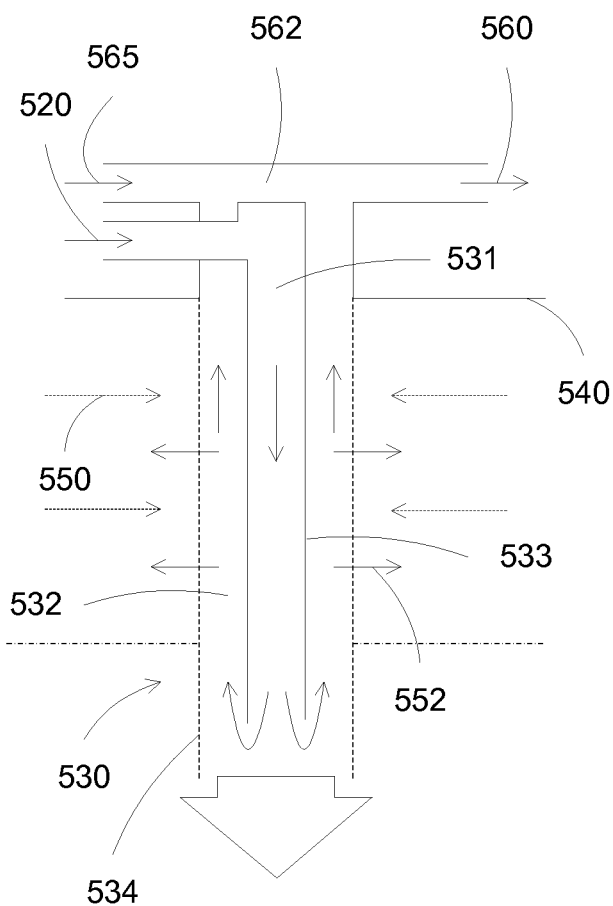
FIG. 5 illustrates another configuration for attracting a contaminant flow from the ground soil according to some embodiments.

FIG. 5 illustrates another configuration for attracting a contaminant flow from the ground soil according to some embodiments. A double wall assembly 530, such as a well point, can include an inner conduit 531 inside an outer conduit 532. An inner wall 533 can be used to separate the inner conduit 531 and the outer conduit 532. A portion of an outer wall 534 can be perforated, for example, having holes or slits to communicate with the surrounding soil. As shown, the inner wall 533 is straight, but a tapered inner wall can be used, for example, to generate a flow velocity difference, which can create a low pressure regime at the outer conduit 532.

An addition conduit 562 can be coupled to the outlet of the outer conduit 532. A high flow 565 can be provided to the conduit 562, which can generate a low pressure regime at the outer conduit 532, attracting the return hot gas flow 560, together with the contaminant flow 550. The flow 565 can be higher than the hot gas flow 520. The flow 565 can have a lower temperature than that of the hot gas 520, such as at room temperature.

In operation, a hot gas 520 can be provided to the double wall assembly 530, together with an addition gas 565 provided to the additional conduit 562. The hot gas 520 can enter the inner conduit 531, and return along the outer conduit 532. The hot gas flow can be released 552 to the surrounding ground soil from perforation along the outer wall 534 of the double wall assembly 530. The additional gas 565 can have high velocity, for example, to attract the return hot gas from the outer conduit 532.

The release 552 of the hot gas to the ground soil can heat the ground soil 540 and the contaminants in the ground soil, turning the contaminants into vapor. A high pressure at the ground soil (due to the vaporization of liquid contaminants into vapor contaminants) and a low pressure at the outer conduit (due to the high flow of the additional gas 565) can drive the vapor contaminants from the surrounding ground soil to the outer conduit, generating a contaminant flow 550 passing the perforated outer wall 534 to merge with the returned hot gas flow in the outer conduit.

In some embodiments, the contaminants, extracted from the ground soil, can be recovered, for example, by condensing into liquid form by a heat exchanger. In addition, the returned hot gas can be recycled, for example, to reduce energy consumption.

Figure 6:
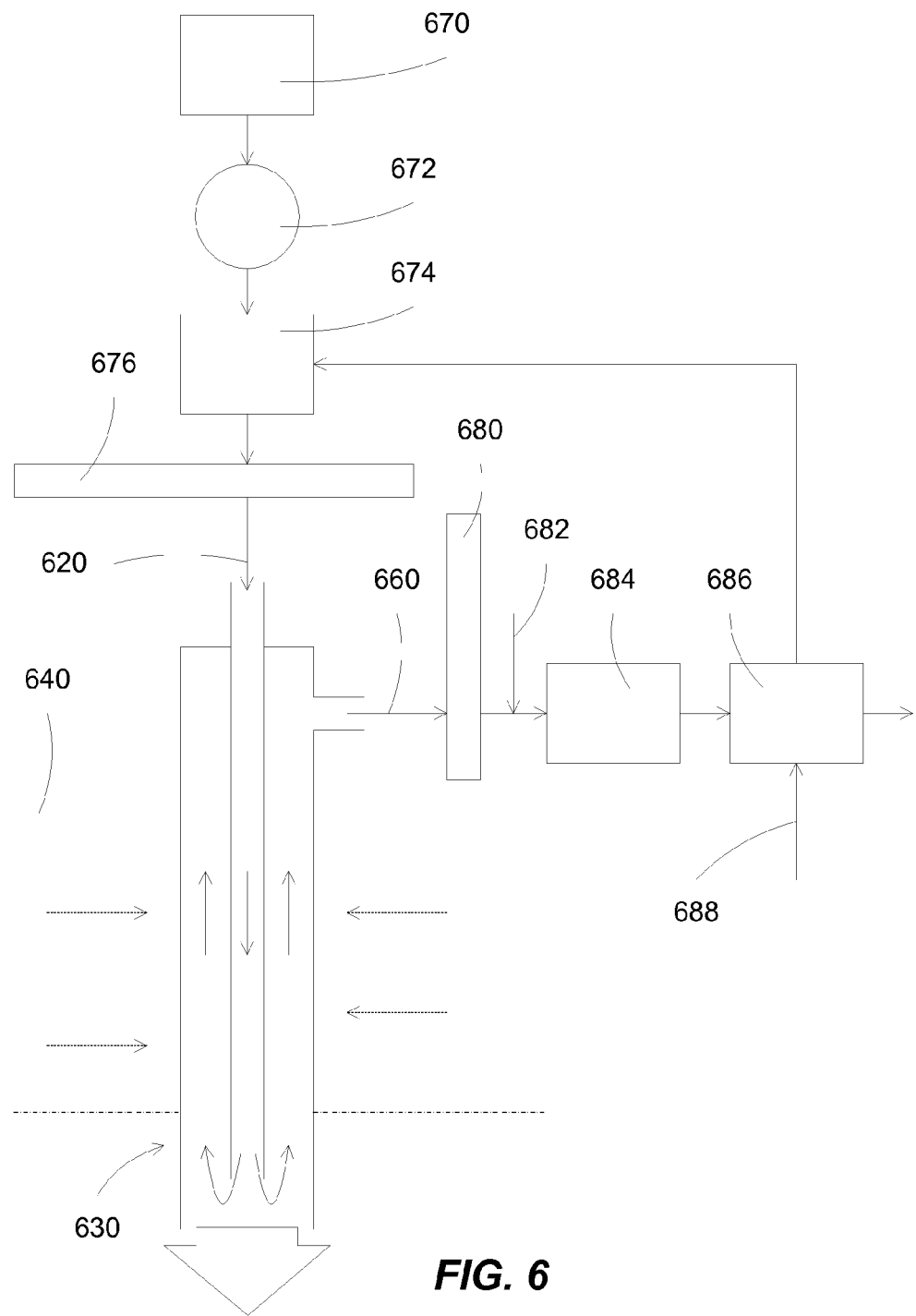
FIG. 6 illustrates an in-situ thermal desorption configuration according to some embodiments.

FIG. 6 illustrates an in-situ thermal desorption configuration according to some embodiments. A well point 630 can be inserted in a contaminated ground soil 640. A hot gas 620 can be introduced to the well point 630. The return hot gas 660 can include volatile contaminants, extracted from the ground soil.

A blower 670, such as a variable induction fan, can be used to generate a gas flow, such as an air flow. A heater assembly 674, such as a ceramic heater element bank, can be used to heat the gas flow, to generate a hot gas 620 to be provided to the well point 630. An optional manifold 676 can be used to distribute the hot gas flow to more than one well points 630. An optional treatment assembly 672 can be used to treat the hot gas, for example, by removing or adding moisture, or by adding additives such as ethanol. For example, the treatment assembly 672 can include an open top desiccant tank, which can be configured to dry the gas, generating a dry hot gas 620 for treating the ground soil. The treatment assembly 672 can include water spray nozzles, which can be configured to wet the gas, generating a wet hot gas 620 for treating the ground soil. The treatment assembly 672 can include nozzles for spraying other additives, such as ethanol.

The mixture flow 660 including the return hot gas with contaminant flow from the ground soil can be treated, for example, to recover the contaminants and/or to reuse the thermal energy.

A recovering assembly can be coupled to the mixture flow 660 to recover all or a portion of the hydrocarbons in the exhaust treatment gas. The recovering assembly can include one or more heat exchangers. The contaminates can be condensed and flow to a phase separator to recover the condensate from heat exchangers. Heavy organics, light organics, and water can be separated in the phase separator and flow through the outlets to collection tanks Remaining residues can be exhausted to a smoke stack.

For example, the mixture flow 660 can pass through a heated catalyst 684 and then a heat exchanger 686 for recovering the contaminants. For example, the volatile contaminants can be condensed in the heat exchanger, which maintains a temperature lower than the liquefied temperature of the volatile contaminants. For example, a desiccated air supply 688 can be provided to the heat exchanger 686, through a blower having PLC controlled catalyst oxidation, which can control the temperature of the exhaust gas to be about 600 F. An output of the heat exchanger 686 can be returned to the heater 674 for recycling.

The mixture flow 660 can be diluted, for example, with desiccated air 682, to maintain a concentration of contaminants in the mixture flow that is blow an explosive limit. For example, dry air can be provided to the mixture flow 660 to provide make air so that the contaminant vapor is less than 25% of the lower explosive limit of hydrocarbon contaminants. An optional manifold 680 can be used to accept the mixture flow 660 from more than one well points 630.

In some embodiments, the present invention discloses methods and systems for in-situ treatment of contaminate ground soil. A pressure cyclic process can be used to alternate between a high pressure and a low pressure regimes. In the high pressure regime, hot gas flow can enter the ground soil, heating the soil and vaporizing the contaminants. In the low pressure regime, the vaporized contaminants can be attracted to the low pressure area, removing the contaminants from the soil. The cyclic pressure process can be performed by a piston and cylinder assembly, or can be performed by alternating gas blowing and vacuum extracting.

Figure 7A:
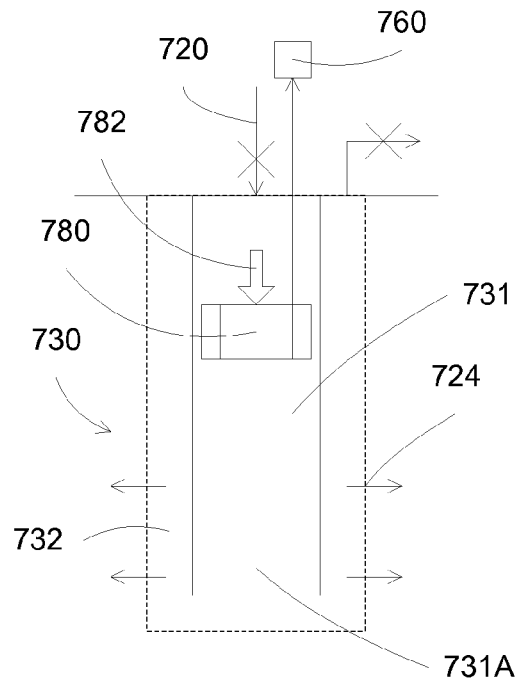
FIGS. 7A-7C illustrate a cyclic process for in-situ thermal desorption according to some embodiments.
Figure 7B:
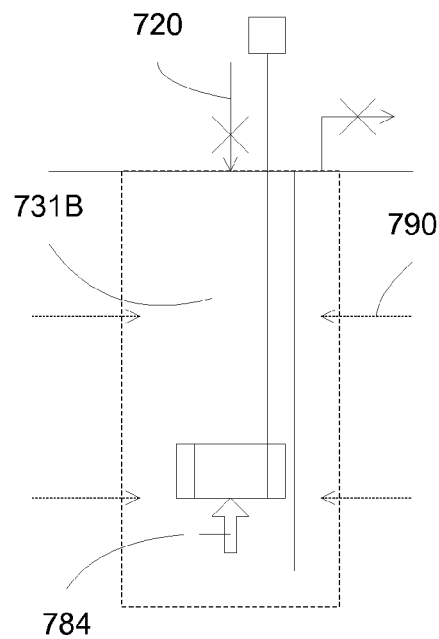
Figure 7C:
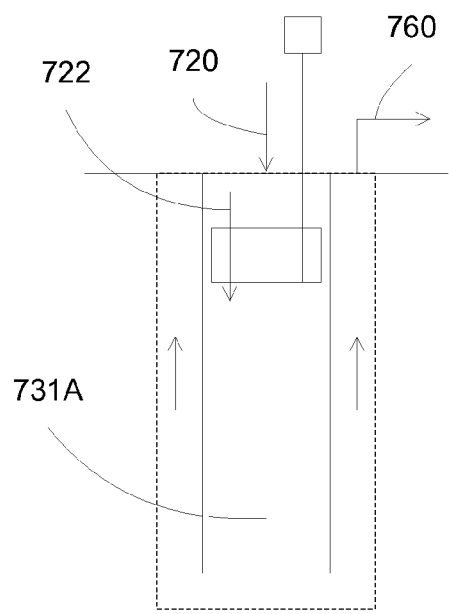

FIGS. 7A-7C illustrate a cyclic process for in-situ thermal desorption according to some embodiments. A well point 730 can include a double wall assembly, with an inner conduit 731 and an outer conduit 732. The inner conduit 731 can act as a cylinder for a piston 780. The outer conduit can include a perforated outer wall. An optional relief valve 760 can be included, for example, to release excess pressure from the well point.

In FIG. 7A, the well point area 731A can be filled with hot gas, and the piston 780 can be pushed down 782 to increase the pressure in the well point. Hot gas can be pushed 724 to the surrounding ground soil through the perforated wall, bringing thermal energy to the ground soil to heat the ground soil and evaporate any contaminants in the ground soil. If the pressure exceeds a certain value, relief valve 760 can be open, releasing some hot gas from the well point area 731A. As shown, the hot gas 720 is shut off when the piston 780 is pushed down. Alternatively, the hot gas 720 can flow to the area above the piston 780.

In FIG. 7B, the piston 780 can be pulled up 784, forming a low pressure area 731B in the well point. Vaporized contaminants can flow 790 to the low pressure area. As shown, the hot gas 720 is shut off when the piston 780 is pulled up. Alternatively, the hot gas 720 can flow to the area above the piston 780. In FIG. 7C, hot gas 720 can flow to the well point 731A, passing 722 through the piston (for example, through a valve in the piston), filling the low pressure area caused by the pulling of the piston. The hot gas can also bring the contaminants toward an exit, forming a mixture flow 760 that can be brought to a recovery assembly to recover the contaminants.

The process can be repeated, pushing hot gas to the ground soil, sucking the contaminants from the ground soil, and bringing the contaminants to a recovery assembly. After the soil is cleaned, cool gas can be introduced to the well point to cool the ground soil. The cool gas can flow to the well point, and being pushed toward the ground soil. During the return of the piston, the cool gas can also flow to the area under the piston, thus eliminating the low pressure regime.

Other configurations can be used, such as a vacuum pump connecting to the outlet conduit in which the mixture 760 flows. The vacuum pump can established a low pressure regime in the outer conduit 732, attracting the contaminants. The vacuum pump can replace the motion of the piston pulling up. The cyclic process can include the pressurized portion of flowing hot gas 720 to the well point, followed by the vacuum pumping action to establish the low pressure portion.

Figure 8A:
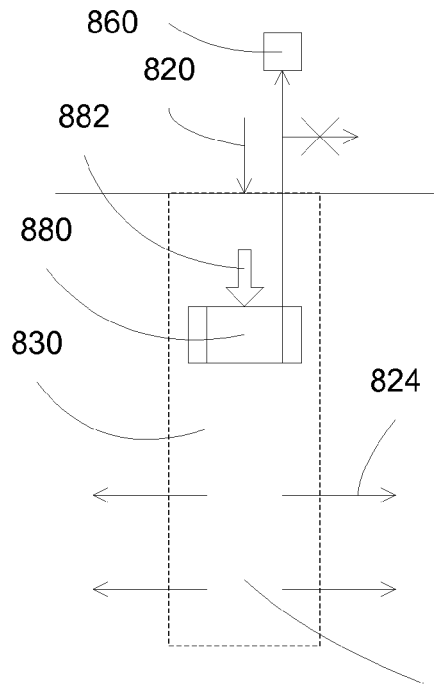
FIGS. 8A-8C illustrate a cyclic process for in-situ thermal desorption according to some embodiments.
Figure 8B:
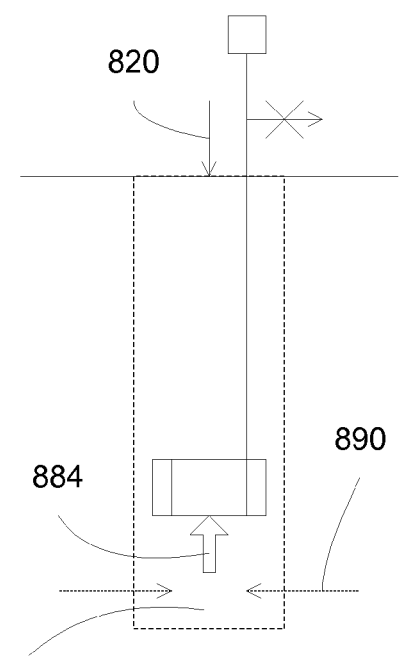
Figure 8C:
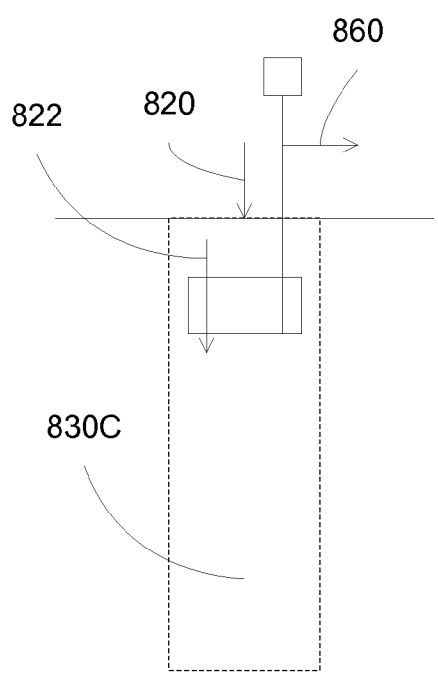

FIGS. 8A-8C illustrate a cyclic process for in-situ thermal desorption according to some embodiments. A well point 830 can include a piston 880 traveling along a conduit 830. The conduit 830 can include a perforated outer wall. An optional relief valve 860 can be included, for example, to release excess pressure from the well point.

In FIG. 8A, the well point area 830A can be filled with hot gas, and the piston 880 can be pushed down 882 to increase the pressure in the well point. Hot gas can be pushed 824 to the surrounding ground soil through the perforated wall, bringing thermal energy to the ground soil to heat the ground soil and evaporate any contaminants in the ground soil. If the pressure exceeds a certain value, relief valve 860 can be open, releasing some hot gas from the well point area 830A. As shown, the hot gas 820 flows to the area above the piston 880. Alternatively, the hot gas 820 can be shut off when the piston 880 is pushed down.

In FIG. 8B, the piston 880 can be pulled up 884, forming a low pressure area 830B in the well point. Vaporized contaminants can flow 890 to the low pressure area. As shown, the hot gas 820 is shut off when the piston 880 is pulled up. Alternatively, the hot gas 820 can flows to the area above the piston 880. In FIG. 8C, hot gas 820 can flow to the well point 830C, passing 822 through the piston, filling the low pressure area caused by the pulling of the piston. The hot gas can also bring the contaminants toward an exit, forming a mixture flow 860 that can be brought to a recovery assembly to recover the contaminants.

The process can be repeated, pushing hot gas to the ground soil, sucking the contaminants from the ground soil, and bringing the contaminants to a recovery assembly. After the soil is cleaned, cool gas can be introduced to the well point to cool the ground soil. The cool gas can flow to the well point, and being pushed toward the ground soil. During the return of the piston, the cool gas can also flow to the area under the piston, thus eliminating the low pressure regime.

Figure 9:
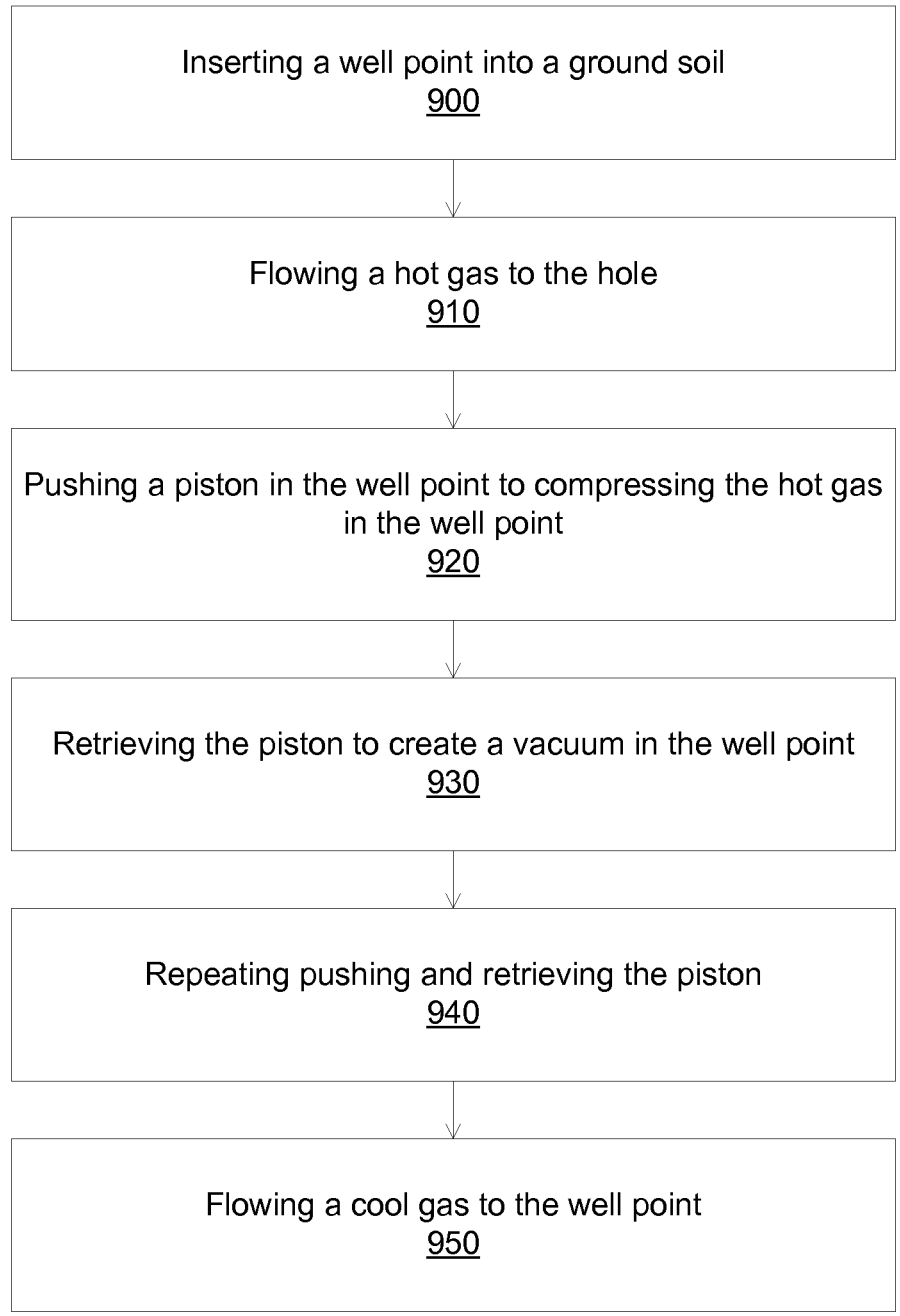
FIG. 9 shows a flow chart for an in-situ thermal desorption process according to some embodiments.

FIG. 9 shows a flow chart for an in-situ thermal desorption process according to some embodiments. A piston mechanism can cyclically pushing hot gas to the ground and pulling contaminants from the ground.

Operation 900 inserts a well point into a ground soil. The soil can be contaminate soil, e.g., soil having hydrocarbon contaminants embedded therein. The well point can include a hollow conduit, such as a single wall or double wall conduit. The well point can have fluidic communication between an inside of the well point with the ground soil. For example, the outer wall of the well point can be perforated to allow fluidic communication with the ground soil.

The well point can include a piston mechanism. For example, the well point can include a cylindrical conduit having a piston inserted therein. The cylindrical conduit can be an inner conduit disposed in an outer conduit of the well point. The cylindrical conduit can be an outer conduit of the well point. The outer wall, or a portion of the outer wall under the ground soil, can be perforated. Thus gas in the cylindrical conduit can be pushed out of the cylindrical conduit, and gas outside of the cylindrical conduit can be pulled in during the motion of the piston. For example, when the piston is pushed down from the top end of the cylindrical conduit, gas in the cylindrical conduit is pushed from the inside of the cylindrical conduit to the surrounding ground soil. When the piston is pulled up from the bottom end of the cylindrical conduit, gas in the surrounding ground soil is pulled from the surrounding ground soil to the inside of the cylindrical conduit.

In some embodiments, multiple well points can be inserted to the ground soil, separating be a distance between 6 and 9 ft, at equilateral distance. The distance between the well points can be chosen so that contaminants can be extracted to the well points.

Operation 910 flows a hot gas to the well point. For example, a hot gas can flow to an interior of a well point, such as to the interior of an inner pipe of a double wall well point, or to the interior of a pipe in the single wall well point. The hot gas can have a temperature above the temperature of the ground soil. The hot gas can have a temperature above a vaporization temperature of a contaminant in the ground soil. For example, the temperature of the hot gas can be between 600 and 1200 F (about 300-650 C). In a first stage of the hot gas flow, the outlet of the well point can be open, thus the hot gas can flush the content of the well point. For example, volatile contaminants can be extracted from the ground soil to the well point during a subsequent low pressure time. This volatile contaminants can be flushed out of the well point, and to a recovery assembly during the hot gas flow. In a second stage of the hot gas flow, the outlet can be close.

Operation 920 compressing the hot gas in the well point, for example, by pushing a piston along a cylindrical conduit. The hot gas flow can stop, for example, by closing the hot gas inlet. The outlet of the well point is close, and thus pressure can build up inside the well point. The compressed hot gas can be released to the surrounding ground soil through the perforated outer wall of the well point.

Operation 930 reduces the pressure in the well point, for example, by pulling the piston back. Volatile contaminants can flow to the low pressure area from the ground soil. The contaminants can be retrieved to in a recovering assembly.

Operation 940 repeats flowing the hot gas, compressing the hot gas, and reducing the pressure in the well point. For example, the hot gas can flow to the well point. At a beginning, the outlet can be open, thus the hot gas can flush the contaminants from the well point. Afterward, the inlet and outlet can be close, and the hot gas can be compressed, for example, by pushing the piston downward. The pressure can be reduced, for example, by pulling the piston upward, extracting the contaminants to the well point. The cycle can be repeated until the contaminants are completely removed from the ground soil, for example, below a detection limit or below a set point. The hot gas and the contaminants can pass through a heat exchanger, in which the contaminants can condense and be collected.

After the contaminants are completely extracted from the ground soil, operation 950 flows a cool gas to the well point. The cool gas can have a temperature below the temperature of the hot gas. The cool gas can have a room temperature, a room temperature air can flow to the hole. For example, the temperature of the cool gas can be about room temperature (between 50-100 F or 10-40 C).

The operation of the cool gas flow can be continuous, e.g., the cool gas can continue to flow to well point and released from the outlet. The operation of the cool gas flow can be cyclic, e.g., similar to the operation of the hot gas. The cool gas can flow to the well point, then being compressed by the piston, pushing the cool gas to the ground soil. The piston can return, extracting some gas from the ground, which can be volatile contaminants, or can be the cool gas that is pushed to the ground soil. The process can continue until the ground soil is cool.

Alternatively, the operation of the cool gas can include the high pressure cycle but without the low pressure cycle. The cool gas can flow to the well point, then being compressed by the piston, pushing the cool gas to the ground soil. During the return of the piston, the cool gas can continue to flow to the well point, thus there is not low pressure regime. The process can continue with the cool gas being flow to the well point during the return of the piston, and pushed to the ground soil during the pressing of the piston.

What is claimed is:

1. A method for in-situ cleaning a contaminate soil, the method comprising
    inserting a double wall conduit into a ground soil, wherein the double wall conduit comprises an inner conduit disposed inside an outer conduit, wherein the inner conduit comprises an inlet at a first end of the inner conduit, wherein the outer conduit comprises an outlet at a first end of the outer conduit, wherein the inner conduit is fluidly communicated with the outer conduit at second ends of the inner and outer conduits, wherein the outer conduit comprises a perforated outer wall;
    flowing a first gas to the inlet, wherein the first gas is heated above the temperature of the ground soil, wherein the first gas passes along the inner and outer conduits to the outlet;
    flowing a second gas to the inlet, wherein the temperature of the second gas is lower than the temperature of the first gas, wherein the second gas passes along the inner and outer conduits to the outlet;
    collecting a flow of volatile contaminants passing through the perforated outer wall, wherein the contaminant flow is configured to mix with the first gas flow at the outer conduit.

2. A method as in claim 1
    wherein the temperature of the first gas is between 300 and 650 C.

3. A method as in claim 1 further comprising
    loosening the ground soil before inserting the double wall conduit into the ground soil.

4. A method as in claim 1 further comprising
    forming a wall in the ground soil before inserting the conduit into the ground soil.

5. A method as in claim 1 further comprising
    restricting the first flow at the outlet, wherein the restriction is configured to attract the first gas from the outer conduit.

6. A method for in-situ cleaning a contaminate soil, the method comprising
    inserting a double wall conduit into a ground soil, wherein the double wall conduit comprises an inner conduit disposed inside an outer conduit, wherein the inner conduit comprises an inlet at a first end of the inner conduit, wherein the outer conduit comprises an outlet at a first end of the outer conduit, wherein the inner conduit is fluidly communicated with the outer conduit at second ends of the inner and outer conduits, wherein the outer conduit comprises a perforated outer wall;

flowing a first gas to the inlet, wherein the first gas is heated above the temperature of the ground soil, wherein the first gas passes along the inner and outer conduits to the outlet;

collecting a flow of volatile contaminants passing through the perforated outer wall, wherein the contaminant flow is configured to mix with the first gas flow at the outer conduit;

pressurizing the first gas to the inner and outer conduit.

7. A method as in claim 6 further comprising relieving a portion of the first gas from the inner conduit or from the outer conduit when the pressure exceeds a pressure level.

8. A method for in-situ cleaning a contaminate soil, the method comprising inserting a double wall conduit into a ground soil, wherein the double wall conduit comprises an inner conduit disposed inside an outer conduit, wherein the inner conduit comprises an inlet at a first end of the inner conduit, wherein the outer conduit comprises an outlet at a first end of the outer conduit, wherein the inner conduit is fluidly communicated with the outer conduit at second ends of the inner and outer conduits, wherein the outer conduit comprises a perforated outer wall;

flowing a first gas to the inlet, wherein the first gas is heated above the temperature of the ground soil, wherein the first gas passes along the inner and outer conduits to the outlet;

flowing a second gas to the inlet, wherein the temperature of the second gas is lower than the temperature of the first gas, wherein the second gas passes along the inner and outer conduits to the outlet;

wherein the temperature of the second gas is between 10 and 30 C;

collecting a flow of volatile contaminants passing through the perforated outer wall, wherein the contaminant flow is configured to mix with the first gas flow at the outer conduit.

9. A method for in-situ cleaning a contaminate soil, the method comprising inserting a double wall conduit into a ground soil, wherein the double wall conduit comprises an inner conduit disposed inside an outer conduit, wherein the inner conduit comprises an inlet at a first end of the inner conduit, wherein the outer conduit comprises an outlet at a first end of the outer conduit, wherein the inner conduit is fluidly communicated with the outer conduit at second ends of the inner and outer conduits, wherein the outer conduit comprises a perforated outer wall;

flowing a first gas to the inlet, wherein the first gas is heated above the temperature of the ground soil, wherein the first gas passes along the inner and outer conduits to the outlet;

flowing a second gas to the inlet, wherein the temperature of the second gas is lower than the temperature of the first gas, wherein the second gas passes along the inner and outer conduits to the outlet;

flowing a third gas passing to the outlet, wherein the third gas is configured to attract the first gas from the outer conduit;

collecting a flow of volatile contaminants passing through the perforated outer wall, wherein the contaminant flow is configured to mix with the first gas flow at the outer conduit.

\* \* \* \* \*